(No Model.)　　　　　　　W. P. BULLIVANT.　　　　2 Sheets—Sheet 1.
TORPEDO DEFENSE.

No. 466,976.　　　　　　　　　　　　Patented Jan. 12, 1892.

Witnesses:
Jonathan Alley
R. M. Huston

Inventor
William Pelham Bullivant
By Foles & Mauro
his Attorneys.

(No Model.) 2 Sheets—Sheet 2.

W. P. BULLIVANT.
TORPEDO DEFENSE.

No. 466,976. Patented Jan. 12, 1892.

Witnesses:

Inventor
William Pelham Bullivant,
By
his Attorneys.

UNITED STATES PATENT OFFICE.

WILLIAM PELHAM BULLIVANT, OF LONDON, ENGLAND.

TORPEDO-DEFENSE.

SPECIFICATION forming part of Letters Patent No. 466,976, dated January 12, 1892.

Application filed October 24, 1891. Serial No. 409,678. (No model.)

*To all whom it may concern:*

Be it known that I, WILLIAM PELHAM BULLIVANT, wire rope manufacturer, a subject of the Queen of Great Britain and Ireland, residing at 72 Mark Lane, in the city of London, England, have invented certain Improvements in Torpedo-Defenses, of which the following is a specification.

My invention relates to torpedo-defenses, and more especially to the broadside-defenses of ships, and has for its object to provide means whereby the booms (or any required number of the booms) from which the torpedo-nets are suspended can be readily, rapidly, and simultaneously brought into their position alongside when the nets are not in use. The booms are connected by swiveling joints to the ship's side and are stayed when in their projecting position (the position when the nets are in use) by stay-ropes connected at one end to the outward end of the boom and at the other end to the ship's side at a short distance on either side of the boom. The ridge-rope and guard-rope are connected to the outer ends of the booms along each broadside, and the end boom of each broadside or the series of booms to be operated simultaneously has secured to it a rope, which is led inboard and passed around a windlass or equivalent hauling apparatus, so that when this rope is hauled in the booms are brought into position to the vessel's side while their outer ends are at the same time raised by the pull of the stay-ropes on the side thereof opposite to the side from which the hauling-rope is operated.

Figure 1:
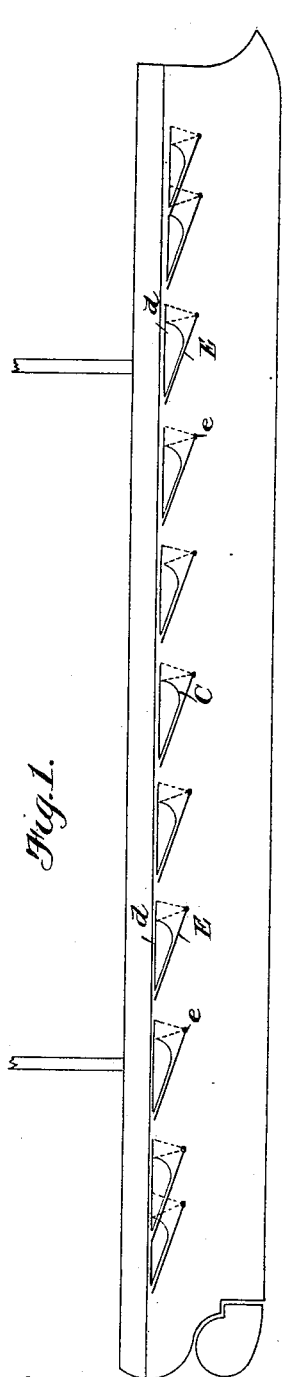
Figure 2:
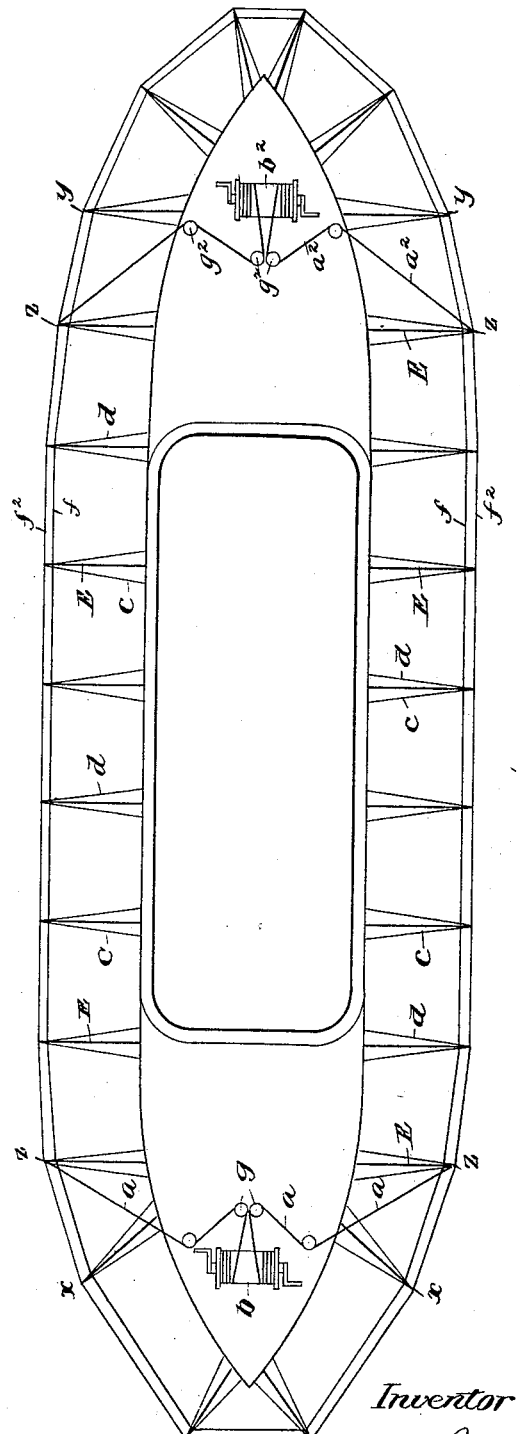
Figure 3:
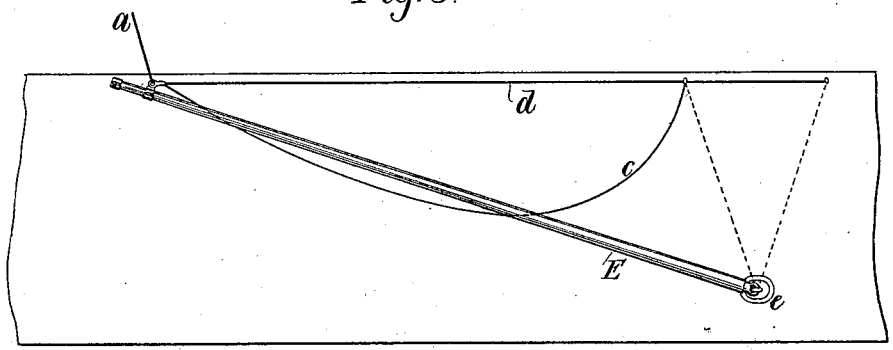
Figure 4:
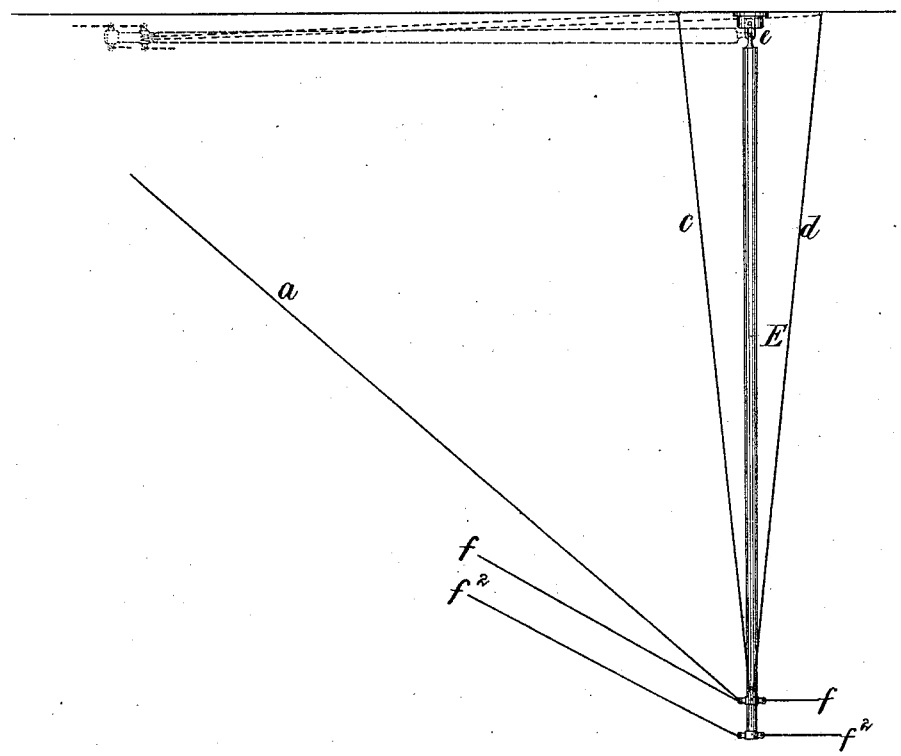

The accompanying drawings represent in Figures 1 and 2 a vessel provided with means for operating the booms according to my invention, Fig. 1 being a side elevation and Fig. 2 a plan. Fig. 3 shows one boom in the position when the nets are out of use, and Fig. 4 shows in plan the said boom in its extended position by full lines and in its out-of-use position by dotted lines.

The booms at the bows (from $x$ to $x$, Fig. 2) and those at the stern (from $y$ to $y$, Fig. 2) may be each brought into position in the usual way; but the booms E at each broadside (from $z$ to $z$) are manipulated according to my invention by means of the hauling-ropes $a$, connected to the end boom of the series on each broadside. When these ropes $a$ (which are shown as being passed over pulleys or sheaves at $g$) are hauled in by the windlass at $b$, (or equivalent hauling means,) all the booms E of the broadside defense are turned on their swiveling joints $e$ toward the ship's side, and at the same time the stay-ropes $d$ of the pairs of stay-ropes $c$ $d$ raise the ends of the booms, so that all the booms at each broadside are caused to take the position shown in Figs. 1 and 3. The ridge-rope $f$ and guard-rope $f^2$ are connected to the outer ends of the booms along each broadside. When the hauling-ropes $a$ are slackened, the booms return by gravity to their projecting position with the nets in position for defense, and they are supported in position by the stay-ropes $c$ $d$. I have also shown in the drawings a duplication of the hauling arrangement at the opposite end of the ship, and I have marked the parts with letters of reference like those used for the arrangement at the stern, but with the numeral 2 added. By this duplex arrangement the booms can be hauled toward either the stern or bows, as desired. It will be understood that I may, however, use one hauling device or more than one such device and place it or them in any convenient part or parts of the ship. Although I have mentioned ropes, yet chains or the like may be used, if desired, and the arrangement can be applied to forts or the like as well as to ships.

Having now particularly described and ascertained the nature of my said invention and in what manner the same is to be performed, I declare that what I claim is—

1. In torpedo-defenses, the combination, with a series of booms swiveled to the main structure and connected at their outer ends by ridge-ropes, of stay-ropes attached to the ends of the booms and to the said structure, and a hauling-rope connected to the end boom of the series, whereby all the booms may be hauled in simultaneously, substantially as described.

2. In torpedo-defenses, the combination, with a series of booms swiveled to the main structure and connected together at their outer ends, of pairs of stay-ropes attached at one end to the boom and at the other to the said structure at a point above the swiveled end of the boom, and a hauling-rope and its operating mechanism, whereby the booms may be simultaneously brought alongside with their outer ends in a raised position, substantially as described.

In testimony whereof I have signed my name to this specification in the presence of two subscribing witnesses.

W. PELHAM BULLIVANT.

Witnesses:
PELHAM JAMES EVANS,
FRANK WASHINGTON BRUCE,
*Clerks, both of 72 Mark Lane, London, E. C.*